United States Patent
Shiley

[15] 3,686,740
[45] Aug. 29, 1972

[54] METHOD OF ASSEMBLYING A SUTURELESS HEART VALVE

[72] Inventor: Donald P. Shiley, 11022 Huntinghorn, Santa Ana, Calif. 92705

[22] Filed: June 19, 1970

[21] Appl. No.: 59,800

Related U.S. Application Data

[60] Continuation-in-part of Ser. No. 547,580, April 4, 1966, abandoned, Division of Ser. No. 687,249, Dec. 1, 1967, Pat. No. 3,587,115.

[52] U.S. Cl. ..................29/439, 29/434, 29/432, 29/445
[51] Int. Cl. ..................B23p 19/00, B23p 11/00
[58] Field of Search........29/432, 434, 439, 445, 157; 3/1; 128/303 R

[56] References Cited

UNITED STATES PATENTS

| | | | |
|---|---|---|---|
| 360,663 | 4/1887 | Daniels | 29/439 X |
| 1,464,386 | 8/1923 | Ingram | 129/439 UX |
| 1,899,343 | 2/1933 | Mackey et al. | 29/439 |
| 2,066,475 | 1/1937 | Kramig et al. | 29/432 UX |
| 3,143,742 | 8/1964 | Cromie | 3/1 |
| 3,371,352 | 3/1968 | Siposs et al. | 3/1 |
| 3,464,065 | 9/1969 | Cromie | 3/1 |

*Primary Examiner*—Charlie T. Moon
*Attorney*—Fowler, Knobbs & Martens

[57] ABSTRACT

An inner ring carrying a check valve is rotatably mounted within an outer ring, and a series of spaced wires are confined between the rings with their free ends positioned in openings in the outer ring. Rotating the inner ring with respect to the outer ring forces the wire ends outwardly to pierce a fabric ring and the surrounding heart tissue and then curl back towards the valve.

6 Claims, 30 Drawing Figures

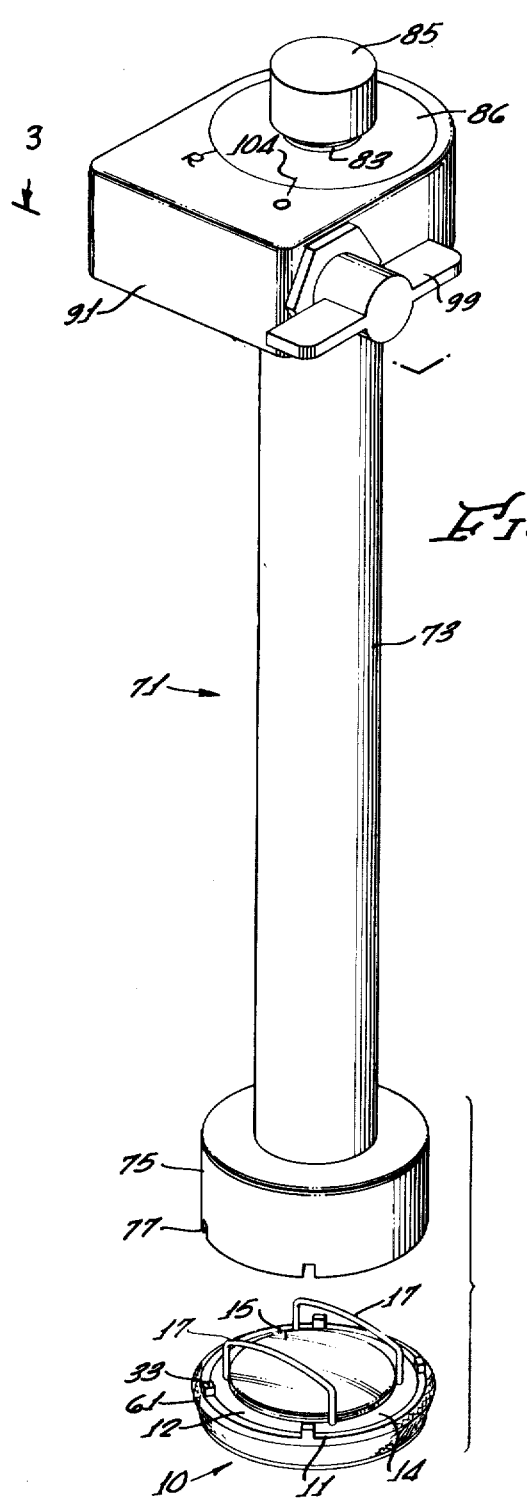

INVENTOR.
DONALD P. SHILEY

INVENTOR
DONALD P. SHILEY

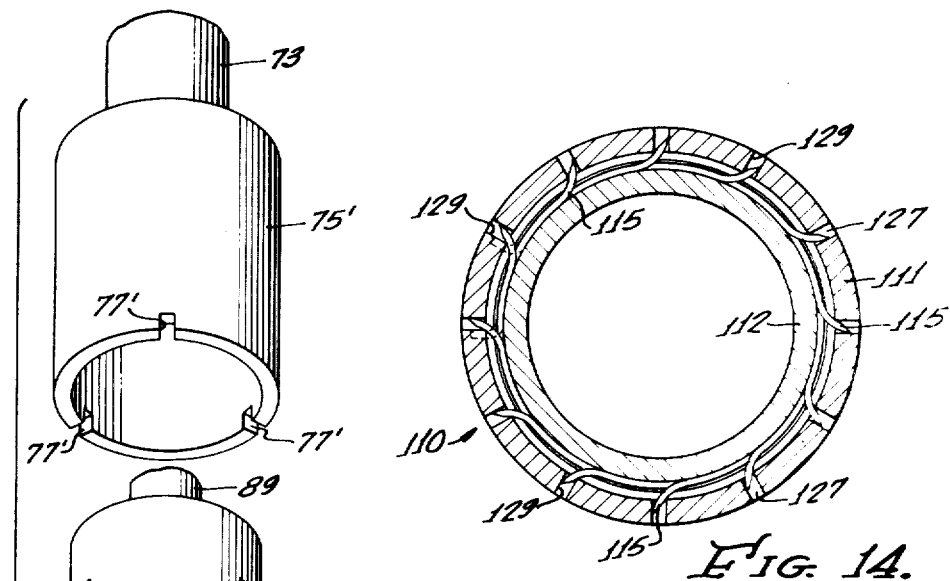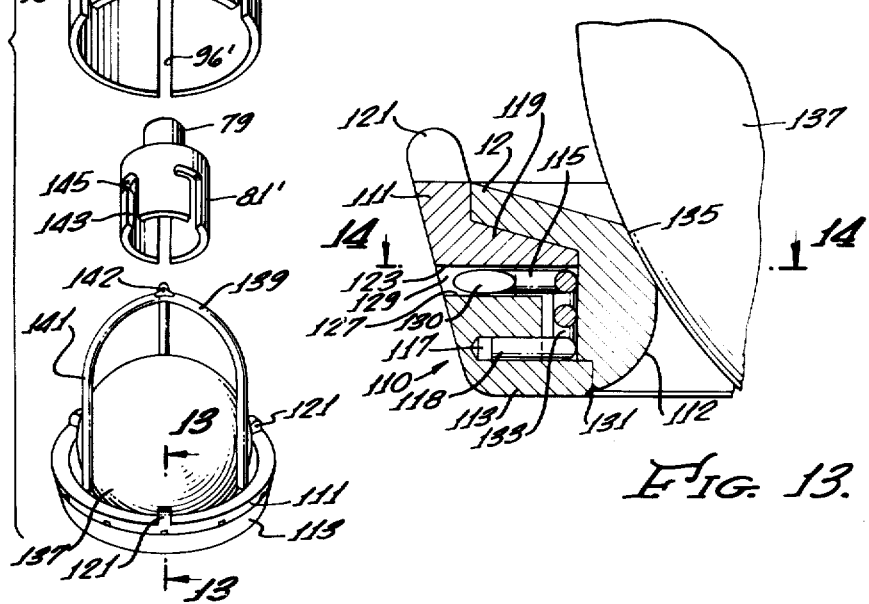

PATENTED AUG 29 1972 3,686,740

INVENTOR.
DONALD P. SHILEY

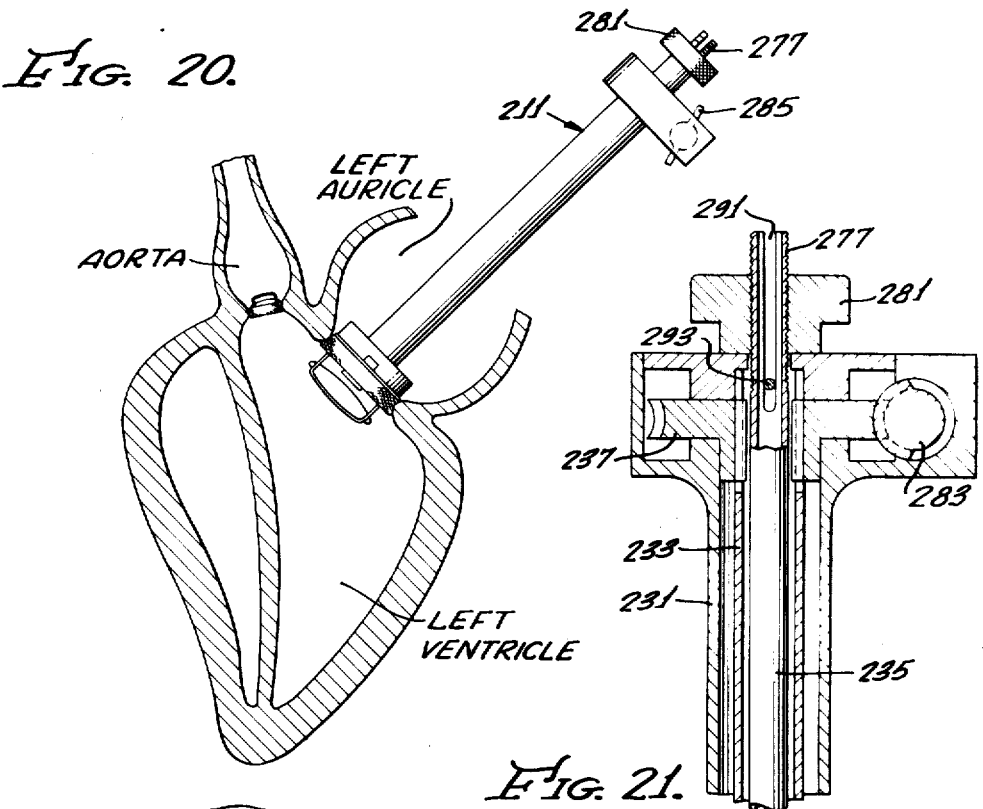
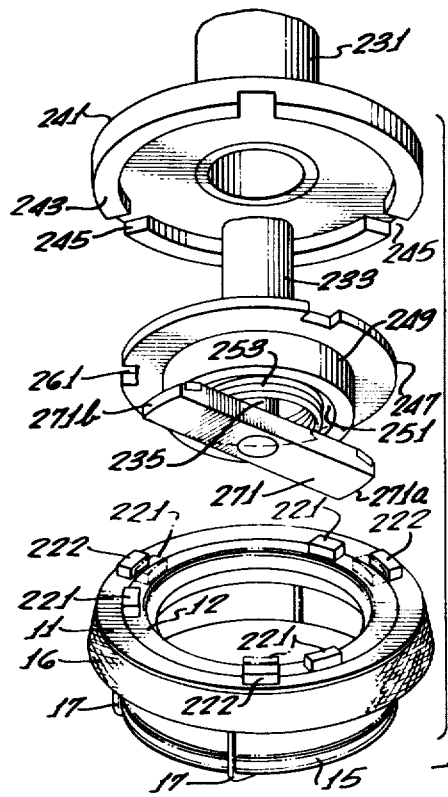
Fig. 20.
Fig. 21.
Fig. 22.
INVENTOR.
DONALD P. SHILEY

INVENTOR.
DONALD P. SHILEY

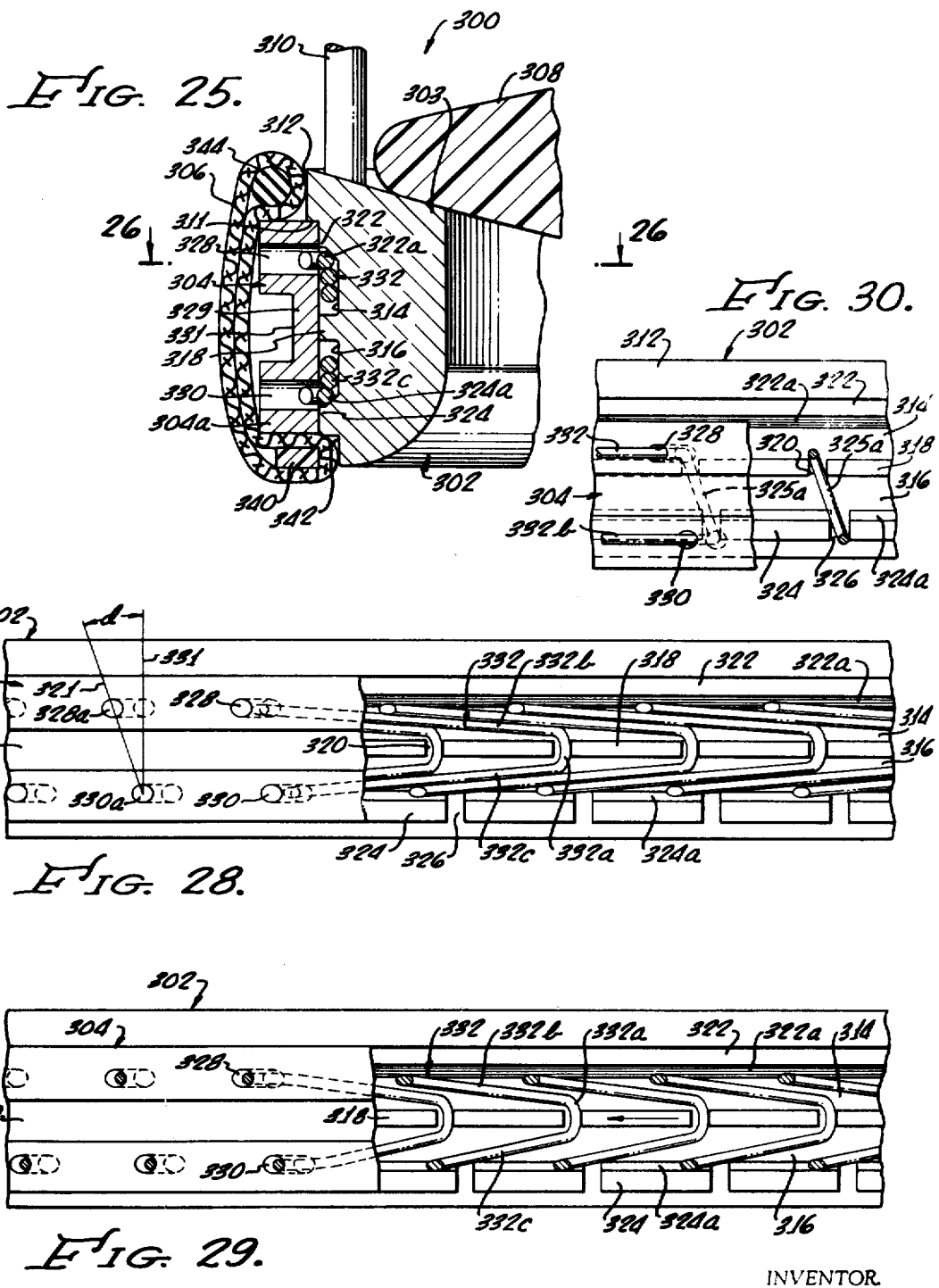

INVENTOR.
DONALD P. SHILEY

METHOD OF ASSEMBLYING A SUTURELESS HEART VALVE

CROSS-REFERENCE TO RELATED APPLICATION

This invention is a continuation-in-part of U.S. Pat. application Ser. No. 547,580, filed May 4, 1966, now abandoned. This invention is a division of Application Ser. No. 687,249 filed Dec. 1, 1967 now U. S. Pat. No. 3,587,115.

This invention relates to improvements in prosthetic devices, and, more particularly, to improvements in so-called sutureless prosthetic heart valves, which are really valves with self-contained sutures. The latter will be used to exemplify the operation of the invention.

With surgical techniques currently available, the complete replacement of a malfunctioning aortic, mitral or tricuspid heart valve is often attempted. While the mortality rate for such replacements, both short and long term, has improved considerably during the past few years, it still remains relatively high. And, this is true even though the basic causes for most failures are fairly well understood.

The overall construction of the prosthetic replacement valve is quite important. Projections or interruptions of the profile of the valve promote the formation of blood clots. Cul-de-sacs of low blood velocity at the margins of a replacement valve and the heart tissue encourage thrombus formation. Moreover, insufficient washing of the metallic parts of the prosthetic replacement contributes to high coronary failure rates.

There is also the recognized incidence of failure due to the trauma occasioned by the replacement operation itself. For most prior art prosthetic heart valves, fastening the valve in place requires an extended period of time. A number of hours of extra-corporeal prefusion and coronary pulmonary bypass is necessary, in part because the valve must be secured by sutures connecting the valve's sewing ring to the tissue surrounding the valvular orifice. While the sutures, the suture knots and various parts of the prosthetic valve itself all contribute to forming nidi which lead to thrombus formation, the extended periods of time along often prove too much for the patient's lowered resistance, and death results.

It is one of the principal objects of this invention, therefore, to provide a prosthesis which can be fastened to the tissues surrounding a passageway in the body, e.g. the valvular opening in the heart, quickly and rapidly. In the case of heart valves, this will minimize coronary prefusion and reduce the danger of thrombus formation.

While the idea of a sutureless heart valve per se is not new, for example U.S. Pat. No. 3,143,742 which issued on Aug. 11, 1964 to H. W. Cromie, discloses one such valve, the sutureless heart valves of the prior art all have certain disadvantages. In some, it is necessary for a portion of the prosthetic valve to rest in overlying relation on both sides of the tissue defining the valvular opening in the heart. This increases the probability of the tissue surrounding the valve opening being torn upon insertion of the valve. In others, the excessive exposed metal surfaces create difficulties since they uncertainly define the boundary between the valve structure itself and the heart tissue. In other prosthetic valves, the sewing ring is not attached to the periphery of the prosthetic valve properly. The sewing ring not only provides retention means for sutures when they are used to anchor the valve body to the tissue, but also provide a good matrix for the tissue to establish a fluid tight margin between the prosthetic valve body and the valvular opening.

SUMMARY OF THE INVENTION

These and other shortcomings of prior art devices, of both the sutureless and suture type prosthetic heart valves, are obviated by the present invention without changing the external appearance of the valve. A plurality of wire sutures are retained interior of the ring body of the novel prosthetic valve for movement to radially extended positions in which they firmly engage the tissue defining the valvular opening in the heart. The wire sutures which are normally contained between an outer and inner ring of the prosthetic device move into the tissue and back toward the rings without exposing any of their metal surface to the action of blood flow through the valve. Thus, the tendency of these metal surfaces in prior art devices to contribute to the unsteady margins between the prosthetic device and the endothelium lining or covering of the heart are reduced. The result is that thrombus formations and clot potentials are reduced.

Broadly speaking, the present prosthetic device has a plurality of wire-like sutures coupled to means for providing a retracted position wherein a substantial portion of each suture has a retracted configuration, and an operative position wherein these portions have a tissue piercing configuration different from that of the retracted position.

The heart valve of this invention, irrespective of whether it is a replacement for an aortic, mitral or tricuspid valve, comprises an outer ring having a plurality of peripherally spaced-apart guide slots formed through it, an inner ring concentrically mounted interior of the outer ring for rotation with respect to it, a movable check valve assembly of either the ball type of disc type including a valve seat and a longitudinally movable check member associated with the inner ring, the wire sutures have portions substantially fixed with respect to the inner ring at peripherally spaced-apart points and a set of their ends extend into the guide slots in the outer ring when the inner ring is in a rotationally retracted position with respect to the outer ring. Means are provided for maintaining the inner ring interior of the outer ring and for rotating the rings with respect to each other so that the wire sutures can move radially outward beyond the outer surface of the outer ring into tissue piercing positions.

In one specific embodiment of the prosthetic heart valve of the present invention, the outer ring has a recessed shoulder to journal an outward projecting shoulder of the inner ring. When the inner ring is in its retracted position with respect to the outer ring, the wire sutures reside in an annulus between the inner and outer rings. Upon rotation of the inner ring with respect to the outer ring, the wire sutures are guided by the radial slots in the outer ring beyond the outer ring into generally circular shapes with the points of the suture wires coming to rest immediately adjacent the periphery of the outer ring. A cloth sewing ring mounted around the outer edge of the outer ring overlying the radial slots is pierced and held by the extended wire sutures. The inner ring is held interior of the outer ring by the retaining force of the wire pins, and the inner ring is prevented from moving beyond the retracted and tissue piercing positions by selecting the depth of the annulus, the thickness of the wire pins, their number and angular separation.

In a second embodiment of the prosthetic heart valve disclosed herein, there is provided an outer ring having a plurality of spaced-apart generally radial notches formed in its lower surface, an upper inner ring concentrically mounted interior of the outer ring, and a lower inner ring integrally attached to the lower part of the upper inner ring so that its flat upper surface contacts the shoulders defining the notches in the outer ring. The outer ring is trapped by the two inner rings which combine to form a U-shaped groove to hold the outer ring in rotatable relation thereto. Deformable wire sutures are positioned intermediate the inner and outer rings in an annulus with one set of their ends retained by the lower inner ring at spaced-apart radial points and the other set lying interior of the slots formed by the notches of the outer ring and the upper surface of the lower inner ring.

In yet a third embodiment of the present invention, the inner ring is L-shaped and has a series of angularly displaced shoulders defining a series of longitudinal notches which cooperate with an annular groove adjacent thereto to retain the pins. The wire pins are bent at their inner set of ends to ride in the longitudinal slots and the annular groove rather than in radial holes formed in the inner ring. The third embodiment also includes a series of serrations formed along the lower edge of the outer ring which engage the outer flared leg on the L-shaped inner ring to hold a fabric sewing ring about the periphery of the outer ring in a position overlying the radial slots through which the wire pins are extended into tissue piercing positions.

In a fourth embodiment of the present invention, two series of spaced slots or openings are formed in one ring for receiving opposite ends of U-shaped sutures. The legs of the sutures are confined within a pair of annular grooves in the outer surface of the other ring while the bight of each suture is retained within a slot formed in a rib extending between the two grooves. Utilizing two rows of tissue piercing sutures improves the connection between the valve and the adjacent heart tissue. To further enhance the connection, the sutures of one series are advantageously circumferentially offset with respect to those of the other series.

In addition to the various embodiments of the prosthetic sutureless heart valves constructed in accordance with the present invention which are disclosed herein, there is disclosed a series of tools for implanting the valves. These tools generally comprise an elongate outer tubular body having a lower locking cup adapted to rotatably hold the outer ring of a prosthetic valve assembly, an inner shaft slideably and rotatably supported interior of the tubular body, an intermediate tubular member rotatably disposed between the body and the inner shaft with its lower end having a locking cup adapted to rotationally lock the inner ring of the valve assembly to the intermediate member at the same time the outer ring is rotationally locked to the tubular body. The inner shaft member has retaining means associated with its lower end operable to retain the inner ring adjacent the lower end of the intermediate tubular member. Means are also provided at the upper end of the tool to operate the retaining means and to rotate the intermediate member with respect to the body.

These tools permit the various prosthetic valves disclosed herein to be positioned adjacent a valvular opening in the heart and permit the inner ring to be rotated with respect to the outer ring to "set" the wire pins into the tissue adjacent the outer edge of the outer ring.

In addition to the prosthetic heart valves and implant tools therefor, there is also disclosed herein a means of assemblying a sutureless heart valve of the type described comprising the steps of mounting the inner ring in the outer ring with the peripherally spaced-apart apertures of the outer ring aligned with the peripherally spaced-apart wire retention points of the inner ring, positioning individual suture wires in the apertures and attaching each to a retention point, and rotating the inner ring to a retracted position with respect to the outer ring to draw the suture wires interior of the outer-inner ring configuration.

DETAILED DESCRIPTION AND DRAWINGS

These and other objects, advantages and features of the present invention will be more fully understood when the following detailed description is read with reference to the drawings, in which:

FIG. 1 is a perspective view of a first embodiment of an aorta disc type prosthetic valve constructed in accordance with the present invention and an exemplary implant tool used to install the prosthetic valve in the aorta valve opening of the heart;

FIG. 2 is a side cross section view of the aortic prosthetic valve and implant tool of FIG. 1 with the valve retained by the implant tool adjacent the aortic-ventricle opening in the heart;

FIG. 12 is an exploded perspective of the lower end of an implant tool for holding and setting a ball type aortic prosthetic valve constructed in accordance with a second embodiment of the present invention to minimize the radial thickness of the valve rings;

FIG. 13 is an enlarged partial diametral section view of an aortic prosthetic valve taken along line 13—13 of FIG. 12 to illustrate the relationship between the outer ring, the inner rings and the wire sutures;

FIG. 14 is a section view of the aortic valve of FIGS. 12—13 taken along line 14—14 of FIG. 13;

FIG. 20 is a side view of an implant tool positioning a mitral disc valve in the heart;

FIG. 21 is a side cross section view of the mitral prosthetic valve and implant tool of FIG. 20 with the valve retained by the implant tool adjacent the left auricle-ventricle opening in the heart;

FIG. 22 is an enlarged exploded perspective of the lower end of the implant tool of FIG. 20 and the mitral prosthetic valve which it is designed to set;

FIG. 25 is an enlarged, cross-sectional, elevational view of one side of the valve of FIG. 23;

FIG. 28 is a linear development of a portion of the side of the valve with a portion of the outer ring cut away to illustrate the position of the sutures in the fully retracted position;

FIG. 29 is a developmental view similar to that of FIG. 28 but with the sutures in their extended positions; and, FIG. 30 is a fragmentary linear developmental view of a side of the valve illustrating the manner in which the inner and outer rings are assembled.

Figure 3:
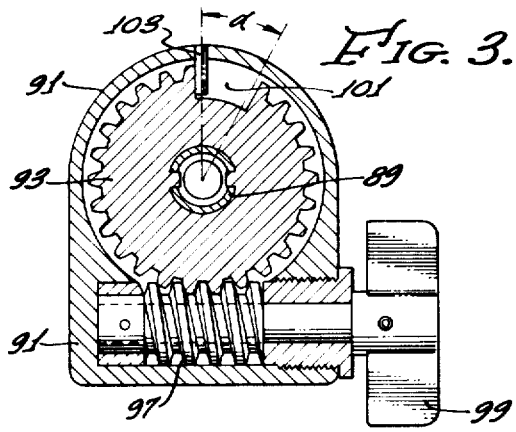
FIG. 3 is a plan section view of the implant tool means for setting the prosthetic valve to its tissue piercing position taken along line 3—3 of FIG. 1.
Figure 4:
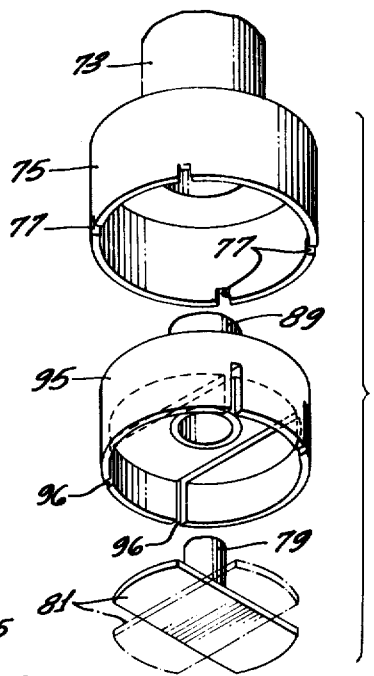
FIG. 4 is an exploded perspective of the lower end of the implant tool illustrated in FIGS. 1 and 2 which retains the prosthetic valve and sets it during installation in the heart.

In the descriptions to follow, the orientation of the valve and implant tools will be described with the upper part of the valve being the part defining a valve seat and having the movable check member, whether of a ball or disc type, cooperating therewith. This procedure will be followed irrespective of whether the valve is designed to be used to replace a mitral, tricuspid or aortic valve. Similarly, the implant tools will be described with reference to their vertical orientation in FIGS. 2 and 21. The upper part of the tools being those parts towards the upper part of the drawings. The lower part of the tools are adapted to cooperate with the prosthetic valves during the implant operation.

VALVE EMBODIMENT OF FIGS. 1-10

A first specific embodiment of the sutureless prosthetic heart valve of the present invention is disclosed in FIGS. 1-10 in conjunction with an exemplary implant tool for setting it in the valvular opening presented after a mitral or tricuspid valve has been removed from the heart. This exemplary prosthetic heart valve 10 comprises broadly an outer ring 11, an inner ring 12 mounted for rotation interior of the outer ring, a plurality of wire sutures or pins 13 cooperating with or coupled to the outer and inner rings 11 and 12, a valve seat 14 formed on the upper side of the inner ring 12 and a movable check member 15 cooperating therewith. There are also provided for cooperation with the basic components of the prosthetic valve 10, a sewing ring 16 which is mounted peripherally around the outer ring 11 and a retaining cage 17 adapted to retain the movable check member 15 in operative juxtaposition to the valve seat 14.

Figure 5:
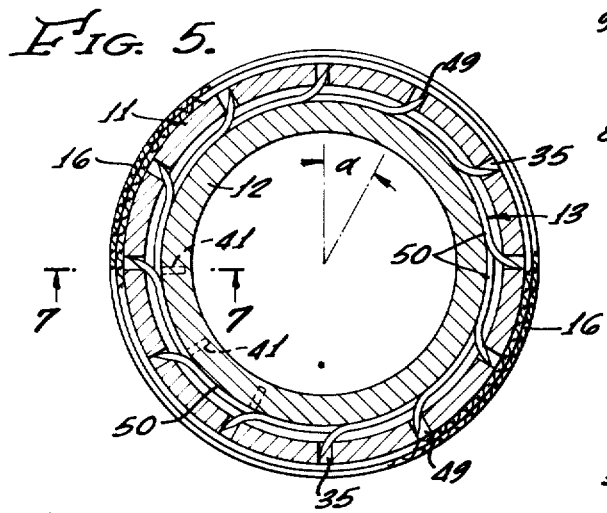
FIG. 5 is an enlarged section view of the prosthetic valve of FIG. 1 taken along line 5—5 of FIG. 2 with the valve in its retracted position.
Figure 6:
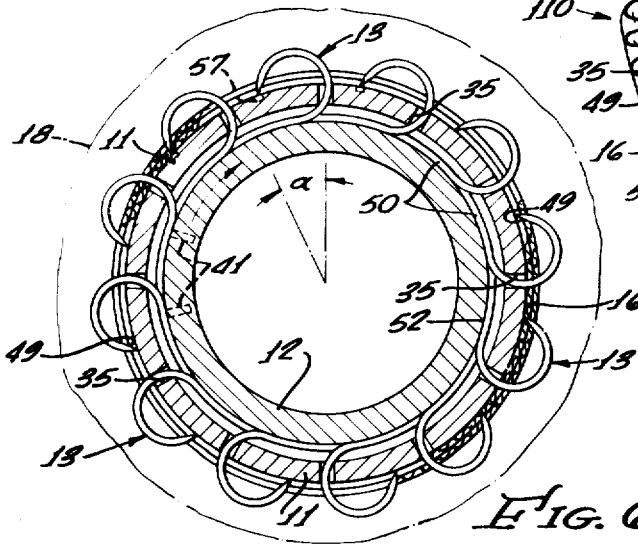
FIG. 6 is also an enlarged section view of the prosthetic valve of FIG. 1 taken along line5—5 of FIG. 2 but with the valve in its tissue piercing position.
Figure 7:
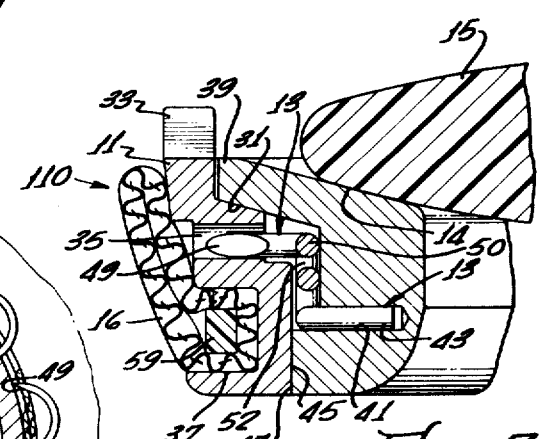
FIG. 7 is an enlarged partial diametral section view of one side of the aortic prosthetic valve constructed in accordance with the invention to illustrate the interrelationship of the inner and outer rings and wire sutures thereof.
Figure 8:
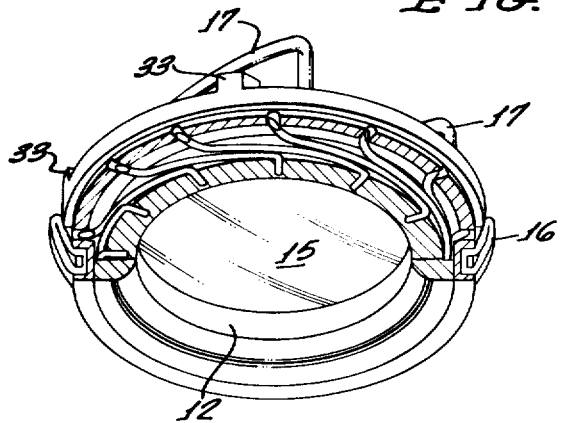
FIG. 8 is an enlarged perspective of the bottom of the aortic prosthetic valve of FIG. 1 in its retracted position with certain parts cut away to more clearly show the construction thereof.
Figure 10:
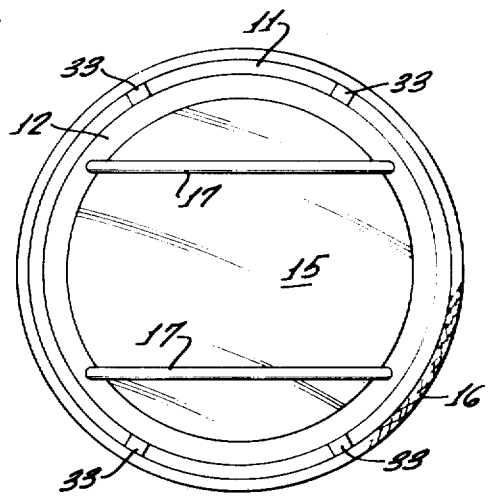
FIG. 10 is an enlarged plan view of the disc valve of FIG. 1.
Figure 9:
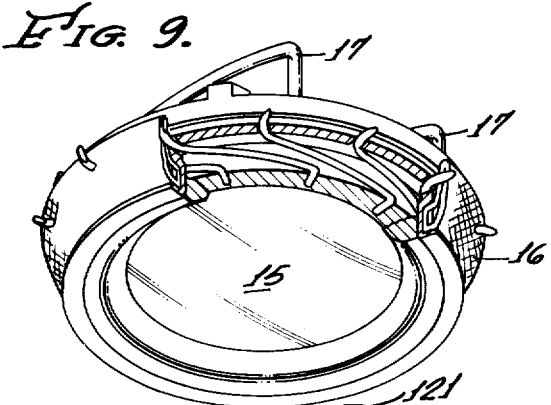
FIG. 9 is an enlarged perspective of the bottom of the valve of FIG. 1 in a position intermediate its retracted and tissue piercing positions with certain parts cut away to more clearly show the construction thereof.

Whereas FIG. 1 illustrates the first embodiment in assembled condition adjacent the end of an implant tool 71 for setting the valve, the various parts of the valve itself can be more easily seen if reference is made to FIGS. 5—9. FIG. 5 illustrates the inner ring 11 in its retracted position with respect to the outer ring 12 (wire pins 13 retracted), whereas FIG. 6 illustrates the two rings in the expanded position (wire pins 13 in extended tissue piercing positions). FIG. 7 is a partial cross-section which illustrates the manner in which the outer ring 11 and the inner ring 12 cooperate with the wire sutures or pins 13. FiGS. 8 and 9 also clarify the cooperation of the parts.

The outer ring 11 is circular in cross-section and has an inwardly extending shoulder 31 which acts to journal the inner ring 12 for rotation with respect thereto. It also prevents the inner ring 12 from moving through (i.e., below) the open outer ring 11 as will be explained in more detail hereinafter. There are a series of four upstanding lugs 33 formed at peripherally spaced-apart points along the upper, outer surface of the outer ring 11 to cooperate with an implant tool such as 71.

Towards the center portion of the outer ring 11 (with respect to the longitudinal axis of the valve 10 along which the valve disc or check member moves), there are provided a plurality of radial slots 35 at circumferentially spaced-apart points on the ring 11. These slots 35 act to receive the wire sutures 13 which are expanded into tissue piercing positions. Towards the lower part of the outer ring 11 and on its outer surface there is provided a groove 37 which is adapted to receive the retaining means for the sewing ring 16.

The inner ring 12, which is journaled for rotation in the outer ring 11, includes an outwardly projecting shoulder 39 on its upper end which is adapted to ride on the shoulder 31 of the outer ring 11. The inner ring 12 has a plurality of apertures 41 formed at peripherally spaced-apart points about its outer surface to receive one set of ends 43 of the wire sutures 13 with which it is designed to cooperate. There is also, as noted above, a valve seat 14 formed on the upper surface of the inner ring 12 to cooperate with the movable valve disc 15.

The inner ring 12 is journaled for rotation by the outer ring 11 by the upper projecting shoulder 39 and a lower outwardly projecting shoulder 45 formed integral with the inner ring 12. These contact the surfaces formed by the inwardly extending shoulder 31 of the outer ring 11 and the surface 47 at the lower part of the outer ring 11.

The wire sutures 13 are equal in number to the number of radial slots 35 formed in the outer ring 11 and the number of apertures 41 formed in the inner ring 12. One set of ends 43 of the wire pins 13 are secured in the apertures 41 formed in peripherally spaced-apart points on the inner ring 12 and the other set of ends 49 are disposed freely in the respective slots 35 formed peripherally about and through the outer ring 11.

The body portions 50 of the suture pins 13 are disposed in an elongated chamber in the form of an annulus 52 formed between the adjacent sides of the inner and outer rings 11 and 12. The annulus 52 is of sufficient depth along the longitudinal axis 55—55 of the valve and implant tool to accommodate the bodies 50 of those wire suture pins 13 which are held between pairs of slots 35 and retaining points 41.

In order to assemble the valve 10 of this first embodiment, the inner ring 12 is concentrically mounted in the outer ring 11 as illustrated particularly in FIG. 7, and the series of slots 35 are aligned with the apertures 41 in the inner ring 12. Since the angular separation α between the adjacent slots 35 coincides with the separations between the apertures 41 and the inner ring 12, all of the pairs align. At this point, a series of wires that are to form the wire pins 13 are inserted from the outside through the slots 35 into the retention points formed by the apertures 41 of the inner ring 12. Thereafter, the inner ring 12 is rotated counterclockwise with respect to the outer ring 11 (when viewed from the top of the prosthetic valve as illustrated in FIGS. 5 and 6) causing the wires to conform to the elongated shape of the annulus 52. The inner ring 12 is rotated counterclockwise (approximately 30°) until it reaches its fully retracted position. At this point, the inner ring 12 is rotated a small distance clockwise with respect to the outer ring 11 and the wires are cut off and the outer set of ends 49 are pointed as illustrated in FIGS. 5 and 6.

As illustrated in FIG. 6, the tissue piercing positions are the fully expanded positions for the wire suture pins 13 and are defined by the point at which the pins 13 have been curled back on themselves and ends 49 are adjacent the outer surface of the outer ring 11.

The retracted position is determined by rotation of the inner ring with respect to the outer ring through the angle α, which in the exemplary embodiment is approximately 30° (see FIGS. 5 and 6). The retracted position itself is normally determined by the longitudinal depth of the annulus 52 as it is related to the peripheral spacing of the slots 35 and apertures 41 and the diameter of the wire pins 13. As can be seen particularly in FIG. 7, the longitudinal height or depth of the annulus 52 is selected so that a pair of the wire pins 13 can be longitudinally stacked in the annulus 52 without binding. As soon as the inner ring 12 is rotated with respect to the outer ring 11 to the point where a third wire pin 13 needs to move into the annulus 52 along with the two then occupying it, it binds or jams the inner ring 12 with respect to the outer ring 11. This point roughly defines the fully retracted position.

The defining of the retracted position can be understood by examining FIGS. 8 and 9. FIG. 8 illustrates the exemplary prosthetic heart valve in its fully retracted position where two adjacent wire pins 13 lie one over the other in the annulus 52. As the inner ring 12 is rotated to the tissue piercing position with respect to the outer ring 11, the wire pins 13 move outwardly from the outer ring 11. FIG. 9 illustrates an intermediate point of this movement. In the tissue piercing position, two adjacent pins 13 barely overlap in the annulus 52. Upon relative rotation in the opposite direction, a position is reached in which a third wire pin 13 must move into the longitudinal annulus space already shared by the two.

The height of the annulus and the diameters of the wires are such that the movement of the third pin tends to jam the inner and outer rings 11 and 12 together, thereby resisting further clockwise rotation of the inner ring 12. A note of caution must be interjected as to the embodiment illustrated in FIGS. 1–10, however, since excessive clockwise rotation of the inner ring will cause the third wire pin to "cam" the inner ring 12 upward and out of the outer ring 11 unless some position stop at the retracted position is provided or the inner ring is axially locked to the outer ring. This is done in some embodiments, e.g. the modification of FIG. 11, but in this first embodiment no such restraint is imposed.

In this first embodiment, the "camming out" is avoided by using an implant tool to load the wires. As will be explained hereinafter, the implant tools have positive stops for the retracted and expanded or tissue piercing positions which will not permit the valves to be over-retracted or over-expanded. Of course, the resistance the third pin creates acts to warn an assembler that the retracted position has been reached.

As noted above, FIG. 5 illustrates the prosthetic heart valve of the type disclosed in FIGS. 1–10 in its retracted position with the outer tips 49 of the sutures 13 interior of the slots 35. FIG. 6 illustrates the same plan view of the prosthetic valve when the inner ring 12 has been rotated to the tissue piercing position. At this point, the wire sutures 13 have been caused to curl back on themselves to complete a circle and terminate the ends 49 of the wire pins 13 adjacent the outer surface of the outer ring 11. This curling can be guided by the shape of slots 35 if the wire is deformable or precurled wires can be used which are straightened out in the annulus before the valve is set.

There can be a plurality of indentations or small depressions 57 formed on the outer surface of the outer ring 11 intermediate the slots 35 to receive the tips 49 of the suture pins 13 and anchor them firmly after the valve has been "set."

The woven fabric sewing ring 16 which is mounted about the periphery of the outer ring 11 is affixed in the groove 37 by a circular retaining ring 59 formed of Teflon or some similar material which is expandable to permit it to snap into place. By containing the ring 59 completely within the sewing ring 16, it is possible to assure that only the sewing ring fabric 16 contacts the tissue 18 of the heart defining the valvular opening.

Figure 11:
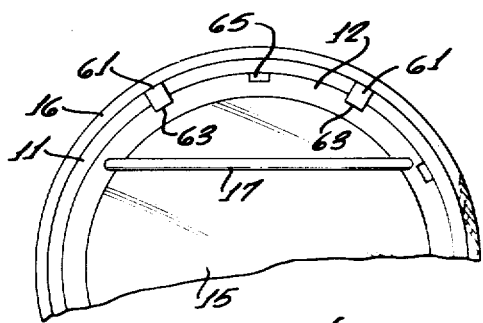
FIG. 11 is a partial enlarged plan view of a modification of the disc valve of FIG. 1.

A modification of the prosthetic heart valve illustrated in FIGS. 1–10 is shown in FIG. 11. Basically, the organization of the various parts are identical except that there is provided a positive lock to maintain the inner ring 12 interior of the outer ring 11 after the wire pins 13 have been inserted and the inner ring 12 has been rotated to its retracted position. There is provided a series of four upstanding lugs 61, which are similar to the upstanding lugs 33 used in connection with the embodiment of FIGS. 1–10, that cooperate with an implant tool. In the modification illustrated in FIG. 11, however, the upstanding lugs 61 have inwardly projecting lips 63 thereon so that they overlie the upper surface of the inner ring 12. In normal operation, the inner ring 12 is prevented from moving upward and out of the outer ring 11 by the inwardly extending lips 63 on the lugs 61, and is prevented from moving downwardly and out of concentric relation to outer ring 11 by virtue of the outwardly extending shoulder 39 which contacts the annular shoulder 31 on the outer ring 11.

In order to initially place the inner ring 12 interior of the outer ring 11, there are a number of longitudinal slots 65 formed along the outer surface of the inner ring 12 at angular separations identical to those defining the positions of the upstanding lugs 61. By rotating the inner ring 12 with respect to the outer ring 11 to register the lug 61 with the slots 65, it is possible to place the inner ring 12 in the outer ring 11 with the inwardly extending lip 63 in registration with the slots 65. Once the inner ring 12 is concentrically mounted in the outer ring 11, however, the inner ring 12 is rotated with respect thereto to displace the inwardly extending lips 63 from the slots 65 so that the inner ring 12 cannot be removed during normal operation. The location of the slots 65 is selected so that they do not register with lips 63 when the inner ring 12 is in its retracted position, its tissue piercing position or anywhere between these positions. Hence, there is no way for the inner ring to ride out of the outer ring.

Before describing the other embodiments of the prosthetic heart valve disclosed and claimed herein, it is appropriate to consider the implant tool used to "set" the valve illustrated in FIGS. 1–11 in the valvular opening of the heart. Such a tool is illustrated in FIGS. 1–4. Before describing the implant tool itself, it is worthwhile noting the particular operations that have to be performed to "set" the prosthetic valve in an opening of the heart.

Taking as an example the setting of a valve in the aortic opening of the heart, it can be appreciated that the natural valve will have been removed leaving a roughly circular opening of muscular tissue defining the aperture between the aorta and the left ventricle (as illustrated, for example, in FIG. 20).

To implant the valve therein, it is necessary to hold the valve in the opening defining the aorta and left ventricle while rotating the inner ring 12 with respect to the outer ring 11 to cause the wire 13 to move outwardly into tissue piercing positions. Basically, therefore, it is necessary to support the prosthetic valve's outer ring in a non-rotatable position in the opening while providing means for rotating the inner ring with respect to the outer ring. This is precisely what the implant tool illustrated in FIGS. 1–4 does.

The implant tool 71 includes generally a hollow circular body 73 having an enlarged open cup 75 at its lower end adapted to overlie the upper surface of the outer ring 11 and to hold the outer ring 11 in a non-rotatable position with respect to the body 73. To do this, the lower circular member 75 has formed in its lower edge a series of notches 77 which are angularly spaced from each other to coincide with the angular separation between the lugs 33 formed on the outer ring 11 of the disc type valve of FIGS. 1–10. The notches or slots 77 engage the upstanding lugs 33 to rotatably lock the body member 73 and the outer ring 11 together.

A solid inner shaft 79 is supported interior of the body 73 for rotation and axial movement. The lower end of the shaft 79 has a flat generally rectangular shaped retainer plate 81 attached to it (see FIG. 4). The shaft 79 is biased upwardly by a coil spring 83 which co-acts between an exterior cap 85 attached to the upper end of the shaft 79 and the upper surface 86 of the body 73.

There is also provided in the implant tool 71 a hollow intermediate shaft 89 which is journaled for rotation by the lower circular member 75 of the body 73 and an interior upper part of the body 91. A pinion gear 93 is staked to the upper end of the intermediate rotatable member 89 and acts to journal that end of the member 89 in the body 73. Attached to the lowermost end of the intermediate member 89 is an inverted cup-like member 95 having a pair of symmetrically opposite slots 96 formed in parallel planes and adapted to correspond to the separation between the wire cages 17 of the valve 10. As previously noted, the lower end 95 of intermediate member 89 is journaled by the interior surface of the lower cup 75.

The inner shaft 79 normally rotates freely with the intermediate shaft 89 and in conjunction therewith acts to lock the inner ring 12 against the interior of the downwardly depending cup 95 which is attached to the lowermost end of the intermediate member 89.

The width of the retainer plate 81 on shaft 79 is selected so that it can move freely between the pair of cages 17 of the disc valve illustrated in FIGS. 1–10. When the cap 85 is pushed downwardly, the shaft 79 moves the retention plate 81 down so that it may be moved through the two U-shaped cage members 17. Thereafter, it is rotated 90° (as illustrated generally in FIG. 4 by the dotted line perspective) to a position where the outer edges thereof engage the under sides of the cages 17 to firmly hold the cages against the cup 95 on the intermediate member 89. This, in turn, holds the cup 75 against the upper surface of the outer ring 11. By this means, the implant tool 71 provides a positive support for the disc valve 10 and rotationally locks the outer ring 11 to fixed position of the body 73.

The intermediate member 89 is rotated by way of the pinion gear 93 through a worm gear 97 which is rotatably mounted in the upper part of the body 91 at right angles to the pinion 93. A handle 99 is provided exterior of the body 73 to permit the worm gear 97 to be rotated thereby rotating the intermediate member 89.

In operation, the implant tool 71 is used as follows: the lower part 75 of the body 73 depends over the upper part of the valve 10 as illustrated in FIG. 1 so that the slots 77 engage the upstanding lugs 33. At the same time, the inner shaft 79 is rotated by way of knob 85 until the retainer plate 81 at its lower end can be moved between the wire cages 17. At that point, the inner shaft 79 is moved downwardly against the spring 83 and rotated approximately 90° so that the outer ends of the retainer member 81 engages the underside of the cages 17 to hold the inner ring 12 firmly inside of the depending cup 95 attached to the intermediate member 89. Since there are provided a pair of parallel slots 96 in the outer edge of the depending cup 95, these fit over the wire cages 17 and permit the inner ring 12 to be rotated by the rotation of the intermediate member. Shaft 79 rotates with intermediate member 89.

Once the prosthetic valve has been properly attached to the lower end of the implant tool 71, the valve is positioned in the aortic opening with the surgeon holding the implant tool body 73 in one hand. Once properly positioned, the handle 99 may be rotated to cause the intermediate shaft 89 to rotate. This moves the wire pins 13 outwardly towards their tissue piercing positions. To avoid any excessive retraction or extension of the wire pins 13, the pinion 93 has a slot 101 cut in one edge thereof corresponding to the angle α through which the inner ring 12 rotates with respect to the outer ring 11 between the fully retracted and the fully extended or tissue piercing positions. An inwardly extending pin 103 is attached to the upper part 91 of the body and projects into the slot 101 to act as a stop between the retracted and fully extended positions of the valve. These positions are shown on the upper end of tool 71 as the retracted (R) and open (O) positions which cooperate with index line 104. By this positive means, it is impossible to "overset" the pins 13 when a valve is being implanted in an opening of the heart. Moreover, if valves such as 10 are assembled by using implant tool 71 or a similar type of device, it is impossible to draw the pins too far into the retracted position thereby causing the inner and outer rings to separate along the longitudinal axis 55—55 of the valve. In this case, the outwardly disposed lips 63 on the FIG. 11 modification of the first embodiment are not needed.

VALVE EMBODIMENT OF FIGS. 13-15

Figure 15:
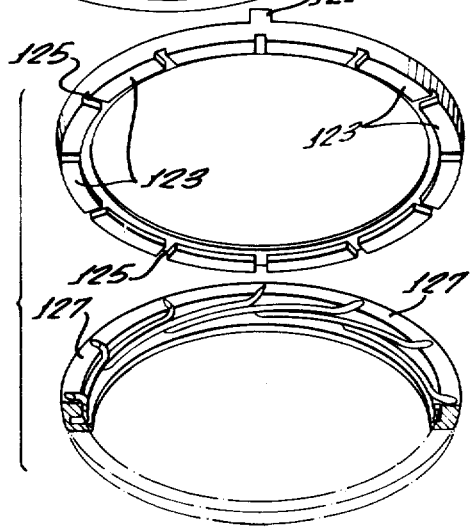
FIG. 15 is an enlarged exploded perspective of the outer ring, inner rings and wire sutures of the mitral valve of FIGS. 12—14.

A second embodiment of a prosthetic valve constructed in accordance with the present invention is disclosed in FIGS. 13-15. The concept of this embodiment is similar to that disclosed in FIGS. 1-10, but the modifications are designed to minimize the radial thickness of the inner and outer rings so that a maximum prosthetic valve orifice area is obtained.

The valve 110 includes an outer ring 111, an upper inner ring 112 and a lower inner ring 113. In order to reduce the width of the valve structure, the plurality of wire pins 115 are secured in the lower inner ring 113 which is generally below the outer ring 111. By positioning the retention points 117 for the inner set of ends 118 of the wire pins 115 outwardly of the part of the inner ring which includes the valve seat, it is possible to minimize the overall thickness of the valve structure.

The outer ring 111 is constructed somewhat similarly to ring 11 of the embodiment of FIGS. 1-10 in that it includes an inwardly extending shoulder 119 and a series of upstanding lugs 121 adapted to cooperate with an implant tool such as 71. However, rather than having a series of slots such as 35 formed peripherally about and through the outer ring, the lower surface 123 of the outer ring 111 has a series of spaced-apart radially oriented notches 125 formed therein through which the wire pins 115 are adapted to move between their retracted and tissue piercing positions. The lowermost surface 123 contacts the upper surface 127 of the lower inner ring 113 to form the series of slots 129 which are comparable to slots 35 of the first embodiment.

In assembling the embodiment illustrated in FIGS. 13-15, the lower inner ring 113 has the plurality of wire pins 115 retained in the series of spaced-apart apertures 117 with the outer or free ends 130 of the wires 115 lying along the upper surface 127 thereof. At this point, the outer ring 111 is placed over the lower inner ring 113 (as illustrated particularly in FIG. 15) to form the series of radial slots 129 in spaced peripheral relation between the outer ring surface 123 and the lower inner ring surface 127.

Thereafter, the upper inner ring 112 is disposed concentric to the outer ring 111 and the lower inner ring 113 (as is most clearly illustrated in FIG. 13). Once the outer ring and two inner rings are mounted with the series of wire pins 115 disposed in the retention apertures 117 and in the slots 129, the lower inner ring 113 and the upper inner ring 112 are welded or otherwise bonded together, e.g. by forming a bead at 131. Thus, the inner rings 112 and 113 form a generally U-shaped inner ring member concentrically mounting the outer ring 111 in the bite of the U for rotation with respect thereto. Again, as in the preceeding embodiment of FIGS. 1-10, there is provided an elongated, interior chamber in the form of an annulus 133 to receive and stack the wire pins 115. The longitudinal depth of this annulus and the diameter of the wires are selected to again provide a stop for the retracted position of the inner ring assembly 112-113 as it rotated with respect to the outer ring 111.

It can be appreciated in connection with this embodiment, that it is not possible to assemble the wires and inner and outer ring elements in the same manner as was possible and desirable with the embodiment disclosed in FIGS. 1-10. Instead, the wire pins 115 are desirably preformed and disposed in the inner ring 113 and in the slots formed by the outer ring 111 and the inner ring 113 in advance of assembling the device 110. It will be noted that this particular arrangement permits the necessary radial spaced taken up by the lower retention points 117 for the wire pins 115 to under lie the slots 129 formed between the upper ring 111 and the lower inner ring 113 so that a double radial width need not be provided.

It will also be noticed in the exemplary embodiment of FIGS. 13-15 that the prosthetic valve employs a ball rather than a flat disc check valve member. While the advantages and disadvantages of ball-type prosthetic devices as opposed to disc types are well known, for the purposes of the present invention it is immaterial which is used, although the embodiment of FIGS. 13–15 utilizes a ball-type to show the interchangeability of the two types of check members.

In this particular embodiment, the valve seat 135 is formed on the inner upper part of the upper inner ring 112 and the ball 137 seats against it. A retaining cage 139 is provided for the ball 137 which includes three post members 141 connected to the upper inner ring 112 at spaced-apart points and terminating at a common point 142 overlying the check valve 137.

While no sewing ring is shown on the second embodiment of FIGS. 13–15, one can and would be used to facilitate attachment of the valve in a valvular opening. The ring could be attached to cover the outer edge of the outer ring and lower inner ring in a manner similar to that illustrated in FIGS. 1–4.

The implant tool used to "set" the prosthetic valve illustrated in FIGS. 13–15 is substantially similar to implant tool 71 used to set the prosthetic valves illustrated in FIGS. 1–11. The only difference in the implant tools resides in the lower parts of the inner shaft 79, intermediate member 89 and the outer body 73. For this reason, only the changed parts of the implant tool will be given different numbers and the other numbers will be continued for this and the implant tool 71 for the valves of the first embodiment. It should also be noted that the use and operation of the implant tool is identical for both prosthetic valves. It is only the hardware that has to be changed to accommodate the triangular cage 139 and the ball type valve structure (see FIG. 12).

The lower cup-like member 75' on the body 73 is similar to 75 but differs in that there are three spaced-apart slots or notches 77' formed in its lower edge to engage three upstanding lugs 121 which are formed intermediate the posts 141 around the periphery of the valve's outer ring 111.

The intermediate member 89 has a depending open cup 95' attached to its lower end which includes three peripherally spaced-apart deep slots 96' formed in its lower edge. These telescope over the legs 141 of the triangular shaped cage 139 to allow the cup 95' to rest against the upper part of the upper inner ring 112.

In order to hold the cage 139 against the cup 95', the inner shaft 79 has attached to its lower end, an open cup type member 81' which cooperates with the upper part of cage 139. The cup-like member 81' includes three L-shaped slots including spaced-apart vertical slots 143 and horizontal extensions 145. The slots are adapted to permit the cup-like member 81' to fit over the top of the cage 131 and thereafter to be rotated to lock the three legs 141 in the horizontal slots 145 formed in the cup member 81'.

In operation, the implant tool is telescoped over the top of the ball-type prosthetic valve as illustrated in FIGS. 13–15 and the inner shaft 79 rotated to cause the cup member 81' to lock the cage 139 interior of the cup 95'. With this locked in place, the outer cup member 75' rests against the notched outer ring 111. Hence, it is possible to rotate the intermediate member 89 to "set" the pins 115 which cooperate with the outer and inner ring assemblies.

Again, as in the case of the implant tool illustrated in FIGS. 1–4, the tool is designed to set an aortic prosthetic valve since the implant tool engages the cage side of the valve rather than the lower part thereof. As will be seen in discussing a modification of the prosthetic valve below, certain modifications in the positions of the lugs and the engagement means must be made in order to set a prosthetic valve in the mitral or tricuspid opening of the heart.

VALVE EMBODIMENT OF FIGS. 16–18

Figure 16:
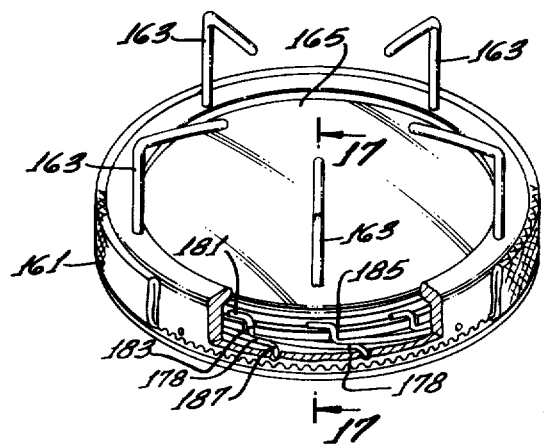
FIG. 16 is a top perspective of a dual cage aortic prosthetic valve constructed in accordance with a third embodiment of the present invention with certain parts cut away to more clearly show the construction thereof.
Figure 17:
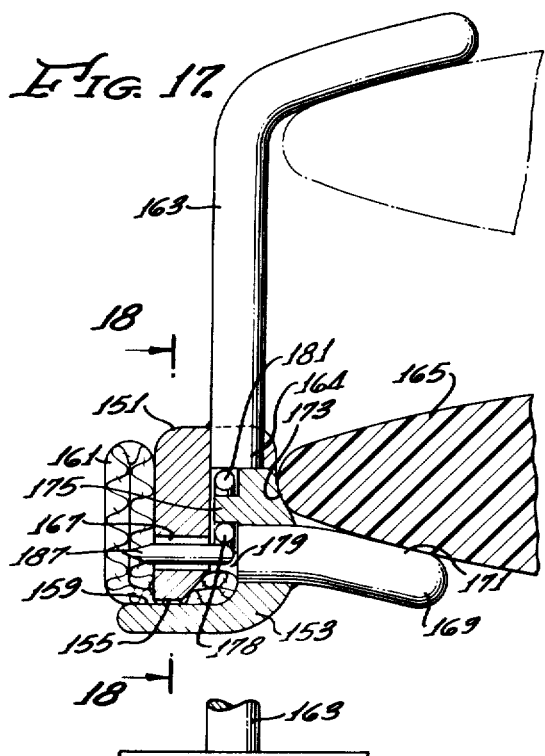
FIG. 17 is an enlarged partial section view taken along line 17—17 of FIG. 16 to show the disc and valve seat.
Figure 18:
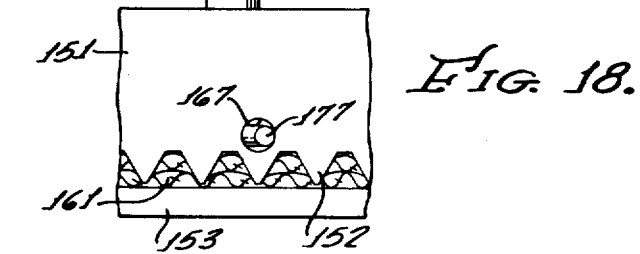
FIG. 18 is a section view taken along line 18—18 of FIG. 17 to illustrate the cloth retention means of the third embodiment.

Turning to FIGS. 16–18, there is illustrated yet a third embodiment of a prosthetic valve constructed generally in accordance with the present invention. The principal distinguishing characteristics of this third embodiment of the prosthetic valve is found in retaining the innermost ends of the wire sutures in an annular ledge on the inner ring directly overlying the chamber in which the wires nest between the outer and inner ring assembly, holding the sewing ring between the outer and inner rings by a series of serrated teeth and employing upper and lower open cages to retain the disc shaped check member.

More specifically, this third specific embodiment includes an outer ring 151 journaled on an L-shaped inner ring 153. The outer ring 151 is also generally L-shaped and fits in an inverted position over the L-shaped inner ring 153 with the lowermost surface of the outer ring having a series of serrations 155 formed therein. These cooperate with the flat inner surface 157 of the inner ring 153 to hold a circular cloth sewing ring 161 therebetween.

At the upper inwardly disposed shoulder of the outer ring 151 there extends a plurality of L-shaped cage legs 163 which are connected at one set of their ends 164 at spaced-apart peripheral points about the outer ring 151 and having their other ends moving inwardly to retain the disc type valve 165 during operation of the prosthetic valve.

A plurality of radially oriented slots 167 are also formed about the periphery of the outer ring 151 at spaced-apart relation and, in the exemplary embodiment, are 12 in number—just as they are in the case of the first and second embodiments previously described.

The inner ring 153 includes five inwardly disposed cage members 169 which prevent the disc valve 165 from moving downwardly through the valve orifice during operation of the valve. The valve seat 173 is formed on the interior upper part of the inner ring 153 and acts in cooperation with the outer lower edge of the disc valve 165 to form a seal.

The outer surface of the upright leg of the inner L-ring 153 has an outwardly projecting shoulder 175 formed annularly thereabouts to retain the wire sutures 177 in place and also to form an elongated chamber in the form of an annulus 179 between the outer ring 151 and the inner ring 153 in which the wire bodies 178 lie. Specifically, the wire suture pins 177 are formed generally in an S-shape with one set of their ends 181 lying on the upper surface of the shoulder 175 and with their intermediate part 183 lying in the longitudinal grooves 185 formed in spaced-apart relation peripherally about the outer surface of the projecting shoulder 175. The other ends 187 of the wire pins 177 are guided interior of the slots 167 formed in the outer ring 151. The longitudinal width of the nesting annulus 179 is again selected so that the pins 177 act to jam as the inner ring 153 is rotated with respect to the outer ring 151 towards a fully retracted position. However, inasmuch as the addition of pins 177 interior of the annulus 179 merely causes the outer ring 151 to ride upward away from the inner ring 153, care must be taken in setting the valve to its retracted position.

It must be noted that as the outer ring 151 rides upward away from the inner ring 153, it will cause the serrated teeth 155 on the outer ring 151 to move away from the surface of the inner ring 153 thereby tending to release the sewing ring 161 normally held in place by these serrations. Of course, as soon as the inner ring and outer ring are rotated with respect to each other to force the outer ends of the pins 177 into their tissue piercing positions, the pins hold the two rings together. They also hold the sewing ring 161 in place inasmuch as it is pierced in a plurality of points by the pins 177, both when the pins move through it initially and also when they curl back towards the outer surface of the outer ring 151 when fully expanded to their tissue piercing positions. In this sense, the construction is quite similar to that of the other embodiments heretofore disclosed.

Again, as in connection with the other embodiments, a series of small depressions or holes 189 in the outer body 151 may be formed intermediate the slots 167 to retain the outer ends 187 of the wire pins 177 after they are curled back adjacent the outer surface of the outer ring 151. These retention points, of course, can be used in connection with any of the embodiments heretofore disclosed.

Figure 19:
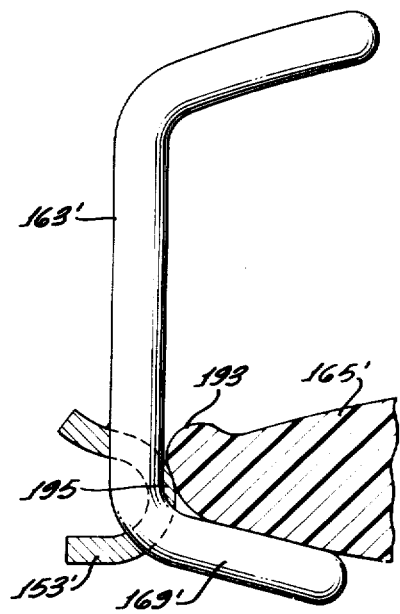
FIG. 19 is an enlarged section taken along a line such as 17—17 of FIG. 16 to illustrate a modification of the third embodiment of the invention as illustrated in FIG. 17.

A modification of the embodiment illustrated in FIGS. 16–18 is shown in FIG. 19. In this case, the upper and lower cage members 163' and 169' are formed as an integral, generally U-shaped member which is attached at peripherally spaced-apart points to the inner ring 153'. This construction will work just as well as that of providing separate upper and lower cages as in the embodiment of FIGS. 16–18, but the unitary construction transfers both cages to the inner ring. However, it would necessitate carefully smoothing and proportioning of the interior dimensions of the retaining cage 163'–169' and the inner ring 153' so that they do not provide any discontinuities or cul de sacs where low blood velocity is present, a situation which would encourage thrombus formation. Moreover, in this case the disc type valve 165' should have a flexible outer end 193 so that as it moves down against the lower leg 169' of the cage, it distorts against the innermost edge 195 of the inner ring 153' to form a seal.

As heretofore explained, the implant tool 71 described in connection with the first embodiments of the prosthetic valves is designed to "set" a prosthetic valve wherein the cage part of the valve is engaged by the lower end of the tool. While this is perfectly satisfactory for replacing aortic valves, it is not possible to use this type of implant tool for replacing mitral or tricuspid valves. In order to replace them, it is necessary for the implant tool to engage the lower part of the prosthetic valve, i.e. that part opposite from the cage structure. Such an implant tool 211 is illustrated in connection with a diagram of the heart in FIG. 20, and the details of the implant tool 211 are shown in FIGS. 21 and 22. While a number of the parts of the implant tool 211 are substantially identical to those of implant tool 71, it will be less confusing to assign different numbers to the various components in the explanation which follows.

VALVE EMBODIMENT OF FIGS. 20–22

The prosthetic valve illustrated in FIGS. 20–22 is identical to that illustrated in FIGS. 1–10 except that it is designed for insertion as a mitral or tricuspid replacement. The upstanding projecting lugs 33 are not placed on the upper surface of the inner ring; instead, a series of lugs are formed on the lower surfaces of the inner and outer rings 11 and 12 to permit cooperation with the implant tool 211 which must grasp the lower or bottom side of the valve.

The valve has an inner ring 12 cooperating with an outer ring 11 and a plurality of wire suture pins 13 cooperating with both. The disc type check member 15 cooperates with the valve seat 14 formed on the inner ring 12 and a cloth sewing ring 16 is disposed around the outer periphery of ring 11. A pair of retaining cages 17 are provided to hold the valve disc 15 adjacent to valve seat 14.

Instead of the upstanding lugs 33, however, there are provided a series of three angularly spaced-apart depending lugs 221 on the lowermost surface of the inner ring 12 and a group of similar depending spaced-apart lugs 222 on the lower surface of the outer ring 11. The use of these downwardly depending lugs 221 and 222 will be explained in connection with the implant tool 211 of FIG. 22.

Tool 211, similar to tool 71, includes an outer body 231, an intermediate hollow tubular member 233 and an inner shaft 235. The intermediate member 233 has a pinion 237 attached to its upper end and is rotatably mounted interior of the body member 231. The inner shaft 235 is slideably mounted interior of the intermediate member 233 and is adapted to rotate with the intermediate member 233.

While the function of the inner shaft 235, the intermediate member 233 and the body 231 are identical to those for implant tool 71, the hardware with which they accomplish their operations are different. The outer body 231 has a lower flange or shallow cup 241 attached to it with a depending annular shoulder 243 formed about its outer periphery periphery. A series of three notches 245 are cut in spaced-apart points around the periphery of the depending shoulder 243 to engage the depending lugs 222 formed on the lower surface of the outer ring 11.

The intermediate member 233 has a flat circular plate 247 attached to its lowermost end which also includes a reduced radii, depending annular shoulder 249. The depending shoulder 249 defines a circular opening 251 adapted to act as a retention chamber for a coil spring 253 which cooperates with the inner shaft 235 as hereinafter explained to retain the inner ring 12 adjacent the end of the intermediate shaft 233 and the flange plate 247.

The flange plate 247 includes a series of three notches 261 formed in its outermost edge at spaced-apart positions to coincide with the depending lugs 221 formed on the inner ring 12. When the plate is in place adjacent the valve, notches 261 receive the downwardly depending lugs 221 to lock the inner ring 12 rotationally with respect to the flange 247.

Since there is no way for the innermost shaft 235 to engage the cage 17 of the prosthetic valve illustrated in FIGS. 20–22, it is necessary to provide other means for locking the inner ring assembly to the intermediate shaft 233 and the flange plate 247. This is provided by generally rectangular shaped retaining member or plate 271 which is attached at the lowermost end of the shaft 235. The outer lower edge of this generally rectangular plate 271 has a groove or excised portion 273 which is adapted to ride on the inside upper surface of the inner ring 12.

Normally, the coil spring 253 acts between the flange plate 247 and the adjacent surface of the rectangular shaped member 271 to urge the shaft 235 and the rectangular member 271 downwardly. A nut 281 is threaded on the upper end 277 of the inner shaft 235 to act to stop against the downward movement of the shaft 235 beyond a preselected position. The upper end of the shaft 235 is split at 291 and a pin 293 rides therein. Pin 293 is staked to the intermediate shaft 233 s that shaft 235 cannot rotate with respect to member 233. This is desirable due to the different manner in which a valve is attached to and disengaged from the tool 211.

In order to use implant tool 211, the threaded nut 281 on the inner shaft 235 is loosened so that the inner shaft 235 is movable in a vertical or longitudinal direction under the force of the compressed spring 253. The nut 281 is loosened so that the shaft and the rectangular retention member 271 on its end can move substantially away from the disc 247 and the lower end of the implant tool 211. Once this is accomplished, the implant tool 211 is tilted so that one end 271a of the member 271 can be moved through the valvular opening of the prosthetic valve before it is tilted the other way to move the other end 271b through the opening so that both parts are on the top part of the inner ring 12. The ultimate position is illustrated in FIG. 21 most clearly.

Once the rectangular member 271 has bee moved through the bottom opening of the prosthetic valve and placed against the upper surface of the inner ring 12, the coil spring 253 is compressed and the valve is pulled up against the intermediate flange 247 by rotating the threaded nut 281 in a clockwise direction. At the same time that the inner ring assembly is firmly held against the plate 247 by the retention member 271, the grooves 245 and 261 in the lower portion of the body 231 and the flange plate 247, respectively, act to engage the depending lugs 222 and 221 on the outer and inner rings 11 and 12.

Once the prosthetic valve is held by the tool 211, the intermediate shaft 233 can be rotated with respect to the outer body member in order to rotate the inner ring 12 with respect to the outer ring 11 and "set" the wire pins 13, as was done in connection with the valve illustrated in FIGS. 1–10.

In order to rotate the intermediate shaft 233, there is provided a worm gear 283 which is rotatably supported in the upper part of the body 231 to rotate the pinion 237. An external handle 285 is provided outside of body 231 for rotating the worm gear 283.

VALVE EMBODIMENT OF FIGS. 23–30

Figures 23, 24:
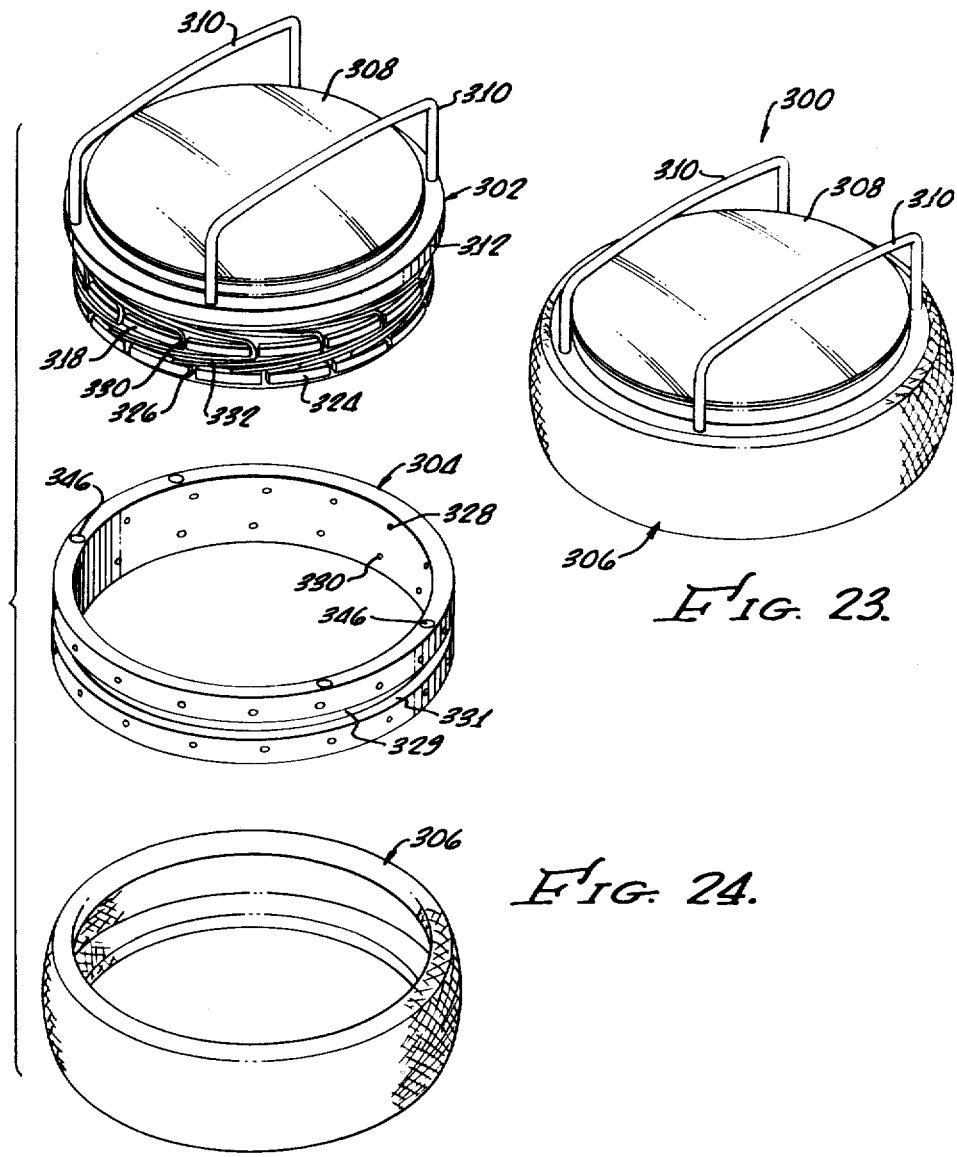
FIG. 23 is a perspective view of a prosthetic valve constructed in accordance with a fourth embodiment of the present invention.
FIG. 24 is a perspective exploded view of the valve of FIG. 23.

Refer now to FIGS. 23–30 for a description of a prosthetic valve made in accordance with another embodiment of the invention. As seen in FIGS. 23–25, the valve 300 includes an inner ring or member 302 surrounded by an outer ring or member 304, in turn surrounded by a sewing ring 306. The inner ring 302 is formed with an inwardly extending shoulder 303 on its upper end, as viewed in the drawings, which forms a valve seat cooperating with a valve disc 308 that is limited in its opening movement by a cage defined by the two wires 310 supported by and extending upwardly from the inner ring 302.

As can be seen from FIG. 25, the outer ring 304 fits snugly and slideably around the central portion of the inner ring 302 with the inner upper end of the outer ring engaging a shoulder 311 formed by an outwardly extending flange 312 on the upper end of the inner ring 302. Within the outer surface of the inner ring 302 there are formed a pair of annular spaces or grooves 314 and 316 separated by an annular rib 318. Each of these grooves has a considerably greater axial dimension than radial dimension, as can be seen in FIG. 25. The grooves 314 and 316 are connected by a plurality of circumferentially spaced, axially extending slots 320 in the rib 318, which are most easily seen in FIGS. 28 and 29.

The upper end of the groove 314 is defined by a cam surface 322a, angled at approximately 45° with respect to the axis of the valve, and by an annular shoulder 322. The lower end of the groove 316 is defined by a similar cam surface 324a and by an annular rib 324. The rib 324 is further formed with a plurality of axially extending slots 326 which are equally circumferentially spaced. The number of slots 326 is equal to the number of slots 320 and the slots 326 are circumferentially offset a slight amount with respect to the slots 320, as best seen in FIGS. 28 and 29. Also, the slots 320 and 326 have approximately the same circumferential dimension.

The outer ring 304 is formed with an upper series of circumferentially spaced openings 328 and a lower series of openings 330 separated by a central portion 329 and a surrounding annular channel 331. The openings 328 and 330 extend from the inner surface of the outer ring 304 to its outer surface in planes substantially perpendicular to the axis of the valve. Rather than being radially oriented, the openings 328 and 330 are, in a preferred arrangement, angled approximately 35° with respect to a radial line, as is indicted by the angle c shown in FIG. 26. As best seen from FIG. 25, the upper series of openings 328 are aligned with the upper end of the annular groove 314 in the inner ring 302. The axial dimension of the annular groove 314 is approximately two or three times that of the diameter of the openings 328. The openings 330, which are of similar size with respect to the annular groove 316, are aligned with the lower end of the groove.

The number of openings 328 is equal to the number of openings 330 and also equal to the number of slots 320 and 326 formed in the ribs 318 and 324. With an outer ring of about an eighth of an inch inner diameter, a preferred arrangement is about 16 openings 328, spaced about 22.5°. As seen in FIG. 28, the openings 328 are circumferentially offset with respect to the openings 330. The amount of offset in the example illustrated is about 4°, and is equal to the offset between the slots 320 and 326. A measure of the offset is also indicated by the angle d in FIG. 28 formed by a line 321 between the centers of the outer ends of an adjacent pair of the openings 328a and 330a and a line 331 parallel to the valve axis and extending through the center of the outer end of the opening 330a. In the example given, the distance between the center planes of the openings 328 and 330 is about 0.110 inches, and the angle d is approximately 20°. A similar angular relationship exists between the slots 320 and 326.

Note from FIG. 25 that the rib 318 on the inner ring 302 engages the surface between the series of openings 328 and 330 in the outer ring 304. Also, the lower end 304a of the outer ring 304 engages the rib 324 on the inner ring 302.

Within the annular groove 314 and 316, there is nested a plurality of wire-like elements 332 which form self-contained sutures for retaining the valve in surrounding tissue. Each element 332 is formed with a generally U-shape as may be seen in FIGS. 28 and 29 with the bight 332a of the U being positioned within a respective one of the slots 320 in the rib 318, and with the legs 332b and 332c forming the sutures. The upper leg 332b of each element 332 extends circumferentially within the groove 314 while the lower leg 332c extends within the groove 316. The outer end of the upper leg or suture 332b extends partially into an opening 328 as may be seen in FIG. 25; similarly, the outer end of the lower leg or suture 332c extends into an opening 330. With the arrangement illustrated in FIGS. 28 and 29, the upper leg or suture 332b is slightly longer than the lower leg or suture 332c in view of the circumferential offset of a pair of openings 328 and 330 in the outer member.

As can also be seen from FIGS. 28 and 29, as well as from FIG. 25, the sutures 332b are confined within the elongated chamber formed by the annular groove 314 in an axial direction by the shoulder 322 and its cam surface 322a, and by the upper surface of the rib 318. The sutures 332c are similarly confined axially in the elongated chamber formed by the groove 316 by the rib 324 and its adjacent cam surface 324a and by the lower surface of the rib 318. Also, the bight 332a of the U-shaped elements 332 is confined circumferentially by the portions of the rib 318 defining the slots 320. The bight 332a of each suture is prevented from radially outward movement by the central portion of the outer ring 304 and prevented from radially inward movement by the inner ring 302. Thus, the bight 332a of each element is substantially fixed with respect to the inner ring. The outer ends of the sutures 332 are, however, free to move through the openings 328 and 330 upon slideable rotation of the inner ring 302 with respect to the outer ring 304. The axially downward movement of the outer ring 304 is limited by the presence of the ends of the wire sutures 332 within the openings 328 and 330. The upward movement is of course limited by the interference between the shoulder 311 on the inner ring 302 and the upper surface of the outer ring 304.

Referring to FIGS. 25, the sewing ring 306 is in the form of a flattened tube surrounding the outer ring 304. The sewing ring 306 is retained in this position by a washer-like retainer 340 positioned within the lower end of the sewing ring and an annular elastic retainer 344 in the upper end of the ring 306. The retainer 340, which has an inner diameter approximately equal to the inner diameter of the outer ring 304, is positioned adjacent the lower end of the outer ring while the fabric forming the sewing ring extends between the retaining ring 340 and the inner and outer valve rings 302 and 304. Note that an annular notch 342 is formed in the lower end of the inner ring and that the fabric forming the sewing ring partially extends into this notched area. As can be seen from FIG. 25, the retainer 344 has a circular cross-section and an inner diameter less than the outer diameter of the outer ring 304, with the result that the sewing ring 306 is effectively positioned by the two retainers 340 and 344.

Refer now to FIG. 30 for an explanation of the fabrication of the elements 332 and their assembly with the inner and outer rings 302 and 304. The ends of sections of suture wires are inserted from the inside of the ring 304 through the openings 328 and 330, respectively, to their fullest extent thereby forming a U-shape with the bight 332a extending from an opening 328 to an opening 330. Note that the bight 332a is angled about 20° with respect to a line parallel to the valve axis because of the circumferential offset of the openings 328 and 330, shown in FIG. 28. With a suture wire 332 positioned in this fashion in each pair of openings 328 and 330, the upper end of the outer ring 304 is started onto the lower end of the inner ring 302 and the bight 325a of each suture is aligned with a slot 326 in the lower rib 324. By moving the outer ring axially onto the inner ring 302 and simultaneously slightly rotating the outer ring with respect to the inner ring, the rings 302 and 304 may be moved to the position indicated in FIG. 30 wherein the bight 332a of the element 332 has entered the slot 320 in the rib 318. Note that the diameter of the element 332 is considerably less than the width of the slots 320 and 326. With continued rotary and axial movement, the outer ring may be completely positioned onto the inner ring so that its upper end engages the shoulder 311 on the inner ring as seen in FIG. 25.

The ring 302 is then rotated with respect to the ring 304 so that the suture wires are drawn into the annular grooves 314 and 316. This movement causes the main portions of the wires to conform to the shape of the groove or chamber and deforms the bights 332a to the shorter length, shown in FIG. 2. The movement is limited by the axial dimensions of the grooves and the diameter of the suture wire in that the sutures will interfere with each other and the axial ends of the grooves 314 and 316 to prevent further movement. The totally retracted position is indicated in FIG. 28 wherein it can be seen that each suture extends a circumferential distance an amount slightly greater than twice the distance between adjacent slots 320 in the rib 318, and three diameters of suture wire are positioned above and below each slot 320.

The suture wires may be pre-cut to the desired length or alternatively they may be cut after being installed. With the latter method, the elements 328 are fully retracted as shown in FIG. 28. Then, the inner ring is rotated slightly in a counterclockwise direction with respect to the outer ring an amount equal to about half the length of the openings 328 and 330. The ends of the sutures are then severed at the outer periphery of the outer ring 304 and the ends suitably sharpened to form the sutures 332b and 332c. The amount severed should be such that when the sutures are once more fully retracted, their outer ends will still remain in the openings 328 and 330 so that they will be properly guided when extended. Also, the ends of the wires are utilized to prevent the inner ring 302 from being withdrawn upwardly from within the outer ring 304.

After the sutures have been properly installed and the inner ring positioned with respect to the outer ring, the sewing ring 306 may be added by expanding the elastic upper retainer 344 to permit the sewing ring 306 to be slipped over the outer ring 304 into the position shown in FIG. 25.

Figure 27:
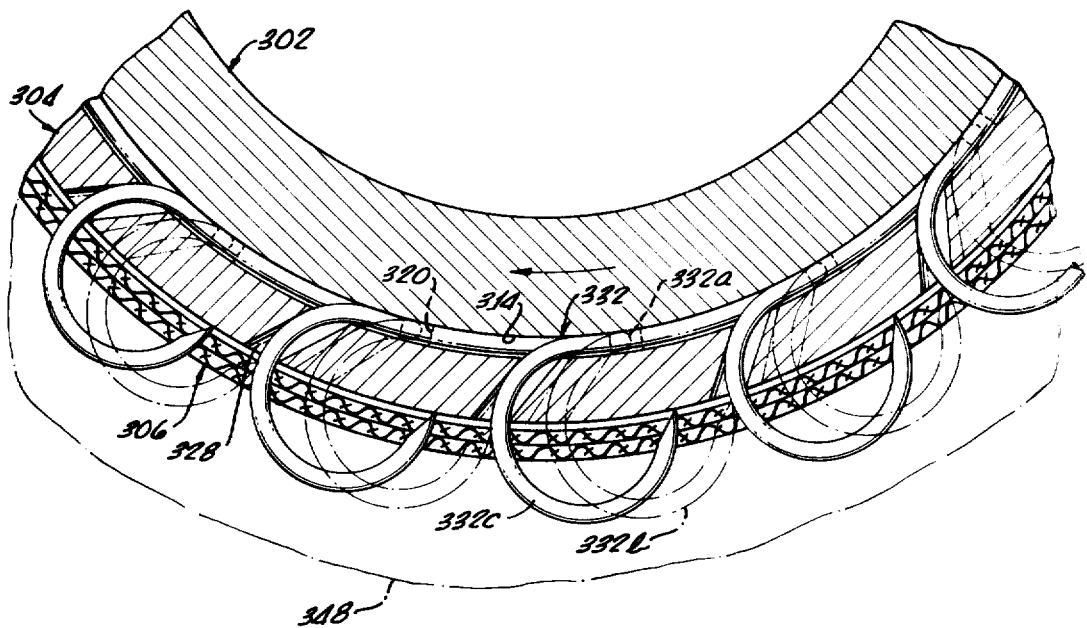
FIG. 27 is a view similar to that of FIG. 26 but with the sutures in their tissue piercing positions.
Figure 26:
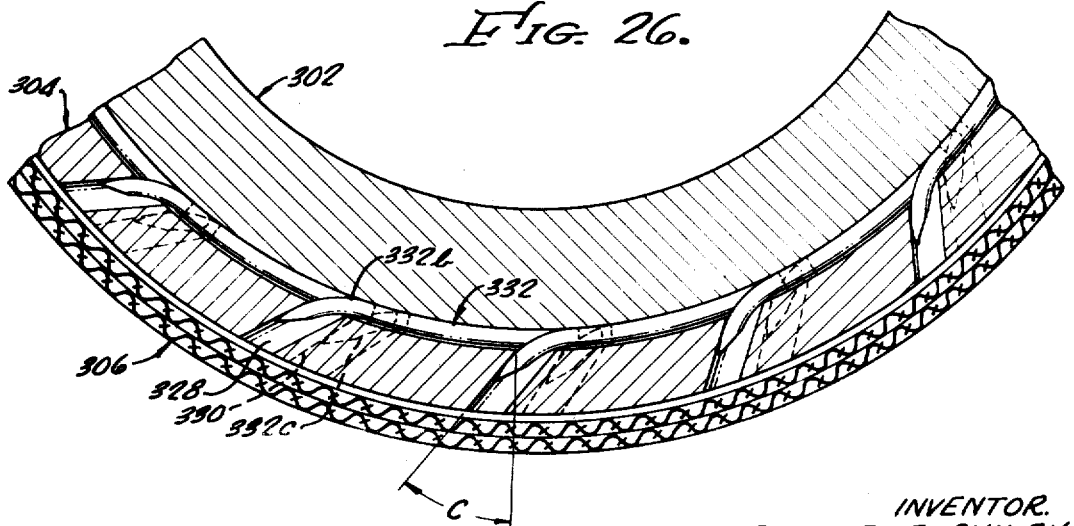
FIG. 26 is an enlarged cross-sectional view of a circumferential portion of the valve on line 26—26 of FIG. 25, showing the sutures in a retracted position.

The valve 32 is installed in a heart in a manner similar to that described with respect to the other embodiments of the invention. The outer ring 304 is held in a fixed position by a suitable tool (not shown) having prongs cooperating with the sockets 346 (FIG. 24) formed in the upper end of the outer ring 304. The elasticity of the retaining element 344 permits insertion of the tool prongs. When the valve is positioned in the proper location, the inner ring 302 is then slideably rotated within the outer ring 304 in a counterclockwise direction as indicated by the arrow in FIG. 29. This action causes the ends of the sutures 332 to be cammed outwardly by the cam surfaces 322a and 324a through the openings 328 and 330. The angle of the openings 328 and 330 causes the sutures 332 to extend outwardly through the material of the sewing ring 306, through the surrounding heart tissue 348, and then back inwardly toward the valve and back through the sewing ring so that at the fully extended position, the sutures look as shown in FIGS. 27 and 29. Note from FIG. 27, that the upper legs of the sutures form an upper series and the lower legs form a lower series and that due to the circumferential offset of the openings 328 and 330, the two series of sutures are similarly circumferentially offset. Such an arrangement improves the attachment of the sutures to the surrounding heart tissue in that a minimum of strain is imposed on the tissue 248 at a given location. With the sutures fully extended, the valve is firmly implanted in the heart and, consequently, the tool may be withdrawn and the valve is ready to operate.

While the present invention has been disclosed by way of a number of exemplary embodiments, it should be apparent to those skilled in the art that various modifications are possible without departing from the spirit and scope of the invention. Therefore, the invention should only be limited by the limitations set forth in the appended claims.

I claim:

1. A method of assembling a sutureless heart valve including an outer ring having a plurality of peripherally spaced-apart openings therethrough, an individual suture wire positioned in each opening and an inner ring journaled for rotation in the outer ring and having a plurality of peripherally spaced-apart retention points for the inner ends of the wire sutures, comprising the steps of:
    mounting the inner ring in the outer ring with the peripherally spaced-apart openings of the outer ring aligned with the peripherally spaced-apart retention points of the inner ring;
    positioning individual suture wires in the openings and attaching each to a retention point; and,
    rotating the inner ring with respect to the outer ring to its retracted position to draw the suture wires interior of the outer-inner ring configuration.

2. A method of assembling a sutureless heart valve including an outer ring having a plurality of peripherally spaced-apart openings therethrough, an individual suture wire positioned in each opening and an inner ring journaled for rotation in the outer ring and having a plurality of peripherally spaced-apart retention points for the inner ends of the wire sutures, comprising the steps of:
    mounting the inner ring in the outer ring with the peripherally spaced-apart openings of the outer ring aligned with the peripherally spaced-apart retention points of the inner ring;
    attaching individual lengths of suture wire through the openings to the retention points;
    rotating the inner ring with respect to the outer ring to a location just short of its fully retracted position to draw a preselected length of the wires interior of the outer-inner ring configuration;
    cutting each wire just beyond the outer surface of the outer ring and sharpening each of the cut ends; and,
    rotating the inner ring to its fully retracted position where the sharpened points are just interior of the outer surface of the outer ring.

3. A method of assembling a heart valve, including an outer ring having two spaced annular series of openings therethrough, a series of generally U-shaped suture wires forming two series of sutures extending outwardly through the two series of openings, an inner ring journaled for rotation within the outer ring and having a pair of annular, suturereceiving grooves radially aligned with the opening and separated by a first annular rib formed with a series of spaced slots for receiving the bight portions of the suture wires, and a second annular rib in the exterior surface of the inner ring forming a wall of one of the grooves and having a series of spaced slots therein, comprising the steps of:
    positioning one leg of each suture wire in a respective opening in one series of openings in the outer ring and the other leg of each suture wire in a respective opening in the other series of openings with the bight portion of the suture wires extending between the two series of openings on the inner side of the outer ring;
    axially aligning the bight portions of the suture wires with the slots of the second rib;
    moving the inner ring into the outer ring so that the bight portions are moved through the slots in the second rib and are then positioned within the slots in the rib between the grooves; and,
    rotating the inner ring with respect to the outer ring to its retracted position to draw the sutures into the annular grooves within the inner ring.

4. The method of claim 3, wherein the openings of one series are circumferentially offset with respect to the openings of the other series and the slots in one rib are circumferentially offset from the slots in the second rib in the same direction and by an amount approximately equal to the offset for the openings, including the step of:

moving the inner ring axially into the outer ring while simultaneously rotating the inner ring a slight amount with respect to the outer ring so that the bight portions of the suture wires may be moved into the slots in the first rib.

5. A method of assembling a sutureless heart valve including an outer ring having a plurality of peripherally spaced-apart openings therethrough, an individual suture wire positioned in each opening and an inner ring journaled for rotation in the outer ring and having a plurality of peripherally spaced-apart retention points for inner portions of the wire sutures, comprising the steps of:

positioning suture wires through the openings of said outer ring and engaging inner portions of the individual suture wires to respective retention points of said inner ring; and rotating the inner ring with respect to the outer ring to its retracted position to draw the suture wires interior of the outer-inner ring configuration.

6. A method of assembling a sutureless heart valve including an outer ring having a plurality of peripherally spaced-apart openings therethrough, an individual suture wire positioned in each opening and an inner ring journaled for rotation in the outer ring and having a plurality of peripherally spaced-apart retention points for inner portions of the wire sutures, comprising the steps of:

positioning said suture wires through said opening of said outer ring;

positioning engaging inner portions of said individual suture wires to respective retention points of said inner ring; and rotating the inner ring with respect to the outer ring to its retracted position to draw the suture wires interior of the outer-inner ring configuration.

* * * * *

PO-1050
(5/69)

UNITED STATES PATENT OFFICE
CERTIFICATE OF CORRECTION

Patent No. 3,686,740          Dated August 29, 1972

Inventor(s) Donald P. Shiley

It is certified that error appears in the above-identified patent and that said Letters Patent are hereby corrected as shown below:

Col. 1, between lines 9 and 10, insert --Background of the Invention--; Col. 16, line 49, delete the second "periphery"; Col. 17, line 24 "s" should be --so--; Col. 17, line 44, "bee" should be --been--; Col. 19, line 19, "grove" should be -- grooves --; Col. 20, line 51, "Fig. 2" should be --Fig. 28~~23~~; Col. 21, line 17, "32" should be --302--.

Signed and sealed this 10th day of April 1973.

(SEAL)
Attest:

EDWARD M. FLETCHER, JR.
Attesting Officer

ROBERT GOTTSCHALK
Commissioner of Patents